Oct. 14, 1941.   A. SOWDEN   2,258,631
PACKING MACHINE FOR CONTAINERS AND THE LIKE
Filed May 16, 1939   6 Sheets-Sheet 1

INVENTOR.
Alfred Sowden,
BY
ATTORNEY.

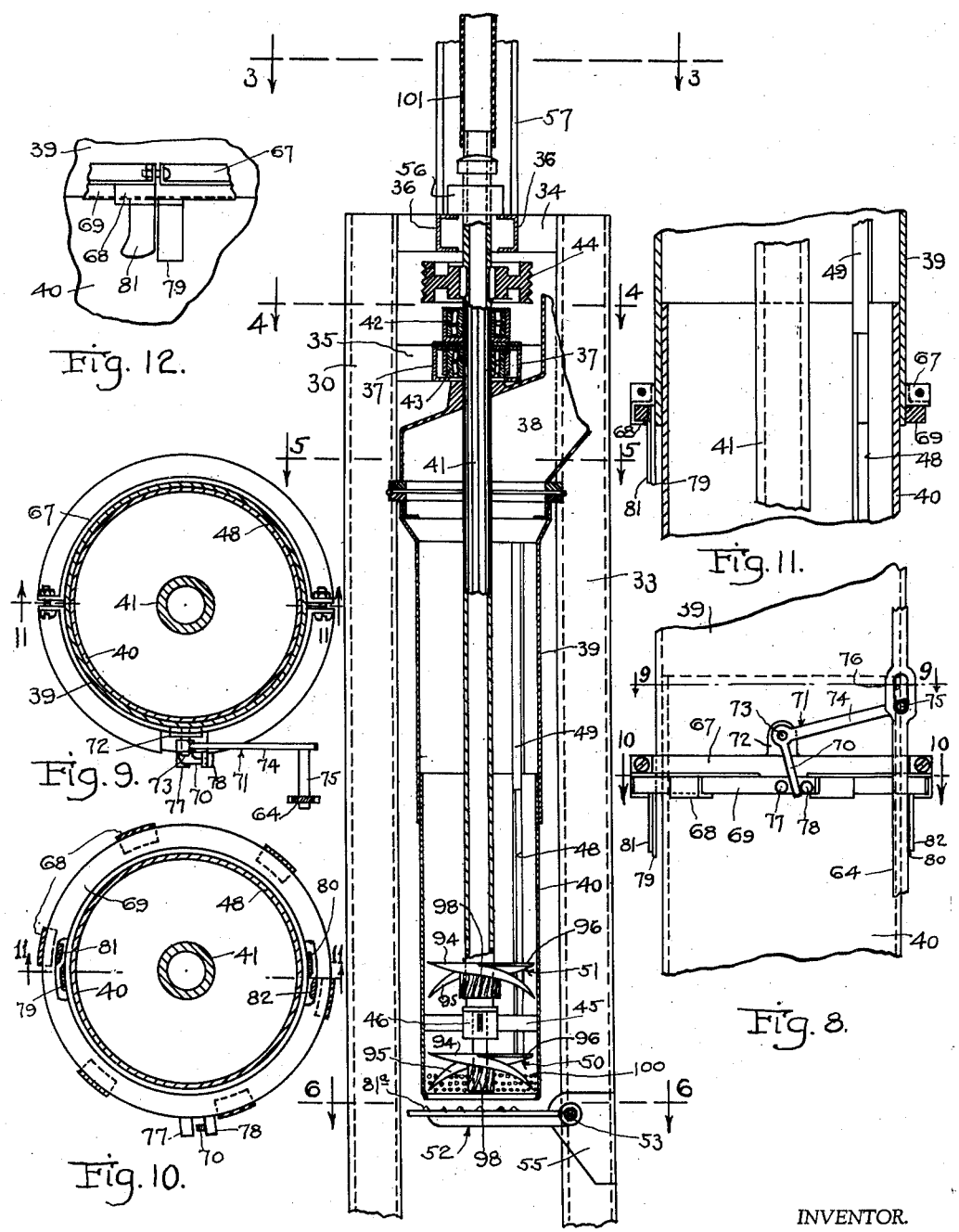

Oct. 14, 1941.  A. SOWDEN  2,258,631
PACKING MACHINE FOR CONTAINERS AND THE LIKE
Filed May 16, 1939  6 Sheets-Sheet 4
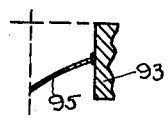
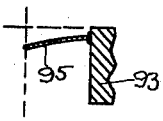
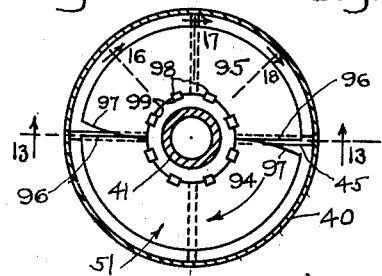
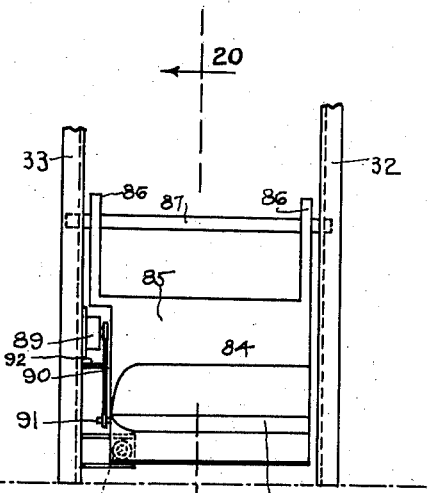
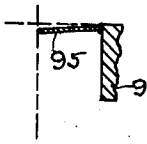
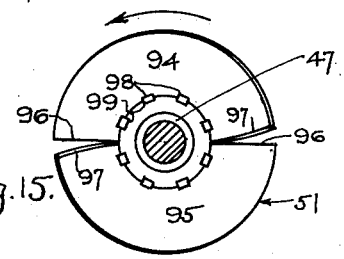
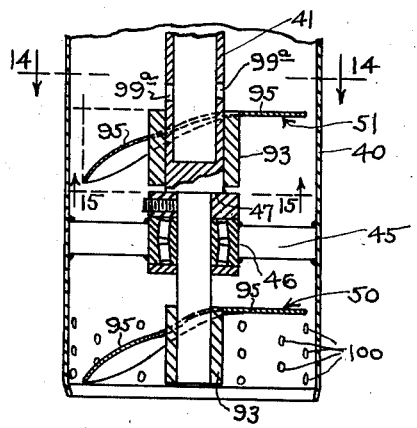
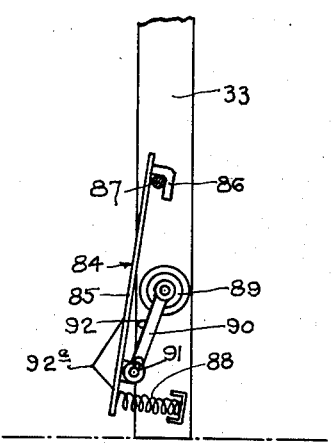
INVENTOR.
Alfred Sowden,
BY
ATTORNEY.

Oct. 14, 1941.    A. SOWDEN    2,258,631
PACKING MACHINE FOR CONTAINERS AND THE LIKE
Filed May 16, 1939    6 Sheets-Sheet 5

INVENTOR.
Alfred Sowden,
BY Thos. A. Davis
ATTORNEY.

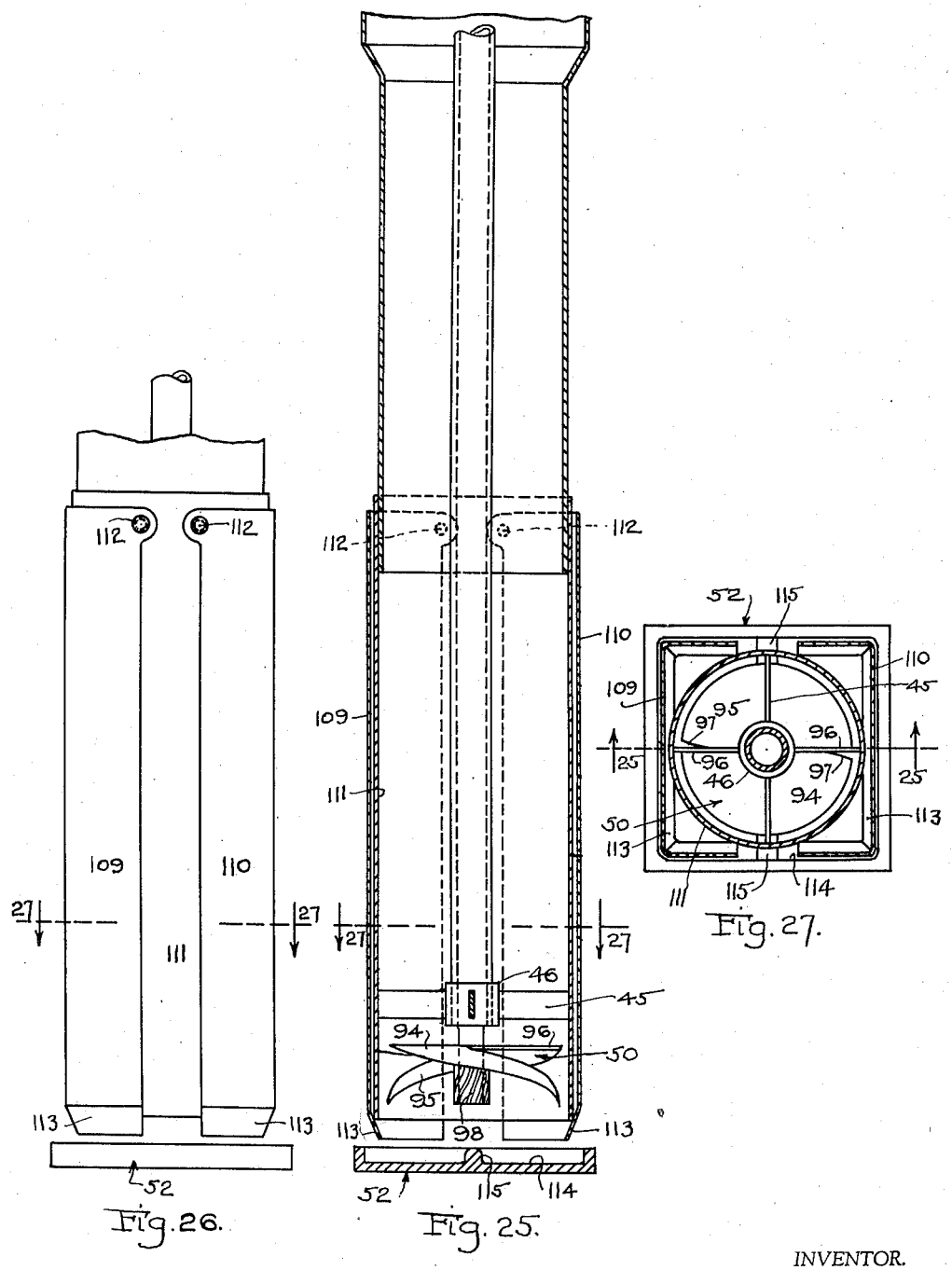

Patented Oct. 14, 1941

2,258,631

UNITED STATES PATENT OFFICE 2,258,631

PACKING MACHINE FOR CONTAINERS AND THE LIKE

Alfred Sowden, Arkansas City, Kans.

Application May 16, 1939, Serial No. 273,973

14 Claims. (Cl. 226—23)

This invention has to do with improvements in packers for packing such materials as flour, mill feeds, and the like, into bags and other containers therefor. The present invention relates to improvements in packers of the general type shown and disclosed in my co-pending application for improvements in Packing machines for containers and the like, Serial No. 199,225, filed March 31, 1938, which became Letters Patent of the United States, No. 2,184,474, dated December 26, 1939. That general type of packer is one in which the bag or other container is supported on a stationary platform or other support during the filling and packing operation, there being provided a vertically movable auger or blade rotating on a vertical shaft extending downwardly into the bag, and capable of moving upwardly as the material is fed and packed into the bag until the operation is completed. At the completion of such filling and packing operation the platform is released and the filled and packed bag is allowed to descend to a suitable conveyor whereby it is carried away. In the meantime the shaft and auger are permitted to descend to their lowered position ready for another operation.

The above type of machines are intended for, and are capable of very rapid operations, several complete operations per minute, in fact, depending among other things on the size of the bags being filled and the nature of the material being packed; but in general it may be stated that rapidity of operation is a great desideratum for reasons readily apparent. For example, I have found that machines embodying my present features may be continuously operated at rates as great as ten complete filling and packing operations per minute when filling and packing pre-weighed batches of substantially one hundred pounds each, or more. With very rapid operations it is found that the elimination of the air from the bag during the filling and packing operation becomes a serious matter, and in fact may become a limiting factor to limit rapidity of operation unless special means are provided for elimination of the air as the operation proceeds. Such elimination of the air must, however, be accomplished without interference with the proper and uniform progress of the packing itself. Furthermore, the air elimination must be accomplished without carrying with such air an excessive amount of the material being packed, be it flour or other very fine material.

The satisfactory progress of the packing operation also requires that the air be released from the position of the auger so that the material being acted on by the auger will be able to assume a permanent degree of compression dictated by the auger, as otherwise it has been found that there may be a tendency of the material to again expand after the packing auger is removed from the filled and packed bag, or after the filled and packed bag is taken away from the influence of the auger; and of course such air released from the position of the auger must be permitted to find its way freely from the mass of the material being acted on.

In general, with the auger type of operation the compressing action takes place at the lower face of the auger blade or blades, since such face is the one which is pressing against the mass of material being packed, so special provision must be made for release of air from such position during the packing operation. Such air release may be effected either inwardly towards the auger shaft, or outwardly towards the surface of the bag, and preferably in both such directions so as to assure most rapid and complete result. Thereby there is assurance that all entrained air will be released with a minimum distance of travel and through delivery orifices of maximum total size.

One of the main objects of the present invention is to provide arrangements whereby the entrained air may be eliminated from the material undergoing packing treatment, both by flow of some of such air outwardly to the surface of the bag at the position of the auger, and by flow of some of such air inwardly to the center of the auger where it may be eliminated upwardly past the auger and past the compressing surface of the auger, either through the body of material flowing down into the bag, or through a hollow shaft whereon the auger is carried. Sometimes I use both of these schemes together, whereas at other times I use one or the other of such schemes individually, as desired, and according to the nature of the material being acted on.

Sometimes it will be found desirable to enhance the air elimination action by use of artificial suction created external to the bag being filled and packed; and in such cases I provide means to apply such suction action directly to the point of compression and packing, namely, to the position of the auger. This is a further object of my present invention.

A further feature of the invention relates to an improved bag gripping or holding arrangement, whereby the bag is firmly held in place during the filling and packing operation, and whereby the bag is so held during the first portion of the bag releasing action as to ensure a certain amount of bag stretching action during the releasing operation, thereby ensuring a smooth and satisfactory appearance and form of the filled and packed bag. In connection with this improved bag holding means it is a further object of the invention to interconnect the same with the bag holding platform so that when the said platform is moved to its bag supporting position it will effect the bag gripping action, the bag having been set into place while the platform was in released position.

In order to improve the packing action, and to facilitate the operation of the auger as it moves upwards in the bag, a further feature of the invention relates to the provision of a telescoping tubular element in the lower end of which the auger operates which tubular element is so connected to the auger that it will rise with the auger during the filling and packing operation. This telescoping tubular arrangement serves also to ensure a more perfect filling and packing action adjacent to the wall of the bag; and I have also provided suitable means for permitting the elimination of entrained air through said tubular element from a position adjacent to the position of the auger therein to a position close to the inside face of the bag being filled.

Sometimes it will be found desirable to provide means to remove and carry away the filled and packed bags, such means taking the form of a conveyor located in position to receive the filled and packed bags as they are delivered by the packer. Sometimes also it will be found desirable to use such conveyor for serving more than a single packer. It is therefore a further object of the present invention to so arrange the packer that filled bags from one or more other packers may be carried past the packer in question by such conveyor, and without interference with the frame or other structure of such packer. In this connection it is an object to so arrange the baffles which control the descent of the filled and packed bags that they will not interfere with proper passage of bags from such other packer or packers so served by such conveyor.

In order to improve the packing action, and to ensure a more uniform packing action over the entire body of the material being acted on, I have provided an improved form of auger. This improved auger is so formed that as it rotates it tends to carry material inwardly towards the axis of rotation, thus overcoming the centrifugal and other tendency of the material to converge outwardly towards the bag. By this means I am enabled to produce a uniformity of packing operation over the entire body of material, notwithstanding the very great rapidity of the operation. In this connection I may mention that sometimes I use very high shaft and auger speeds (for example, 1500 to 1750 R. P. M. with ten to twelve inch augers) in order to accomplish my great rates of bag filling and packing operations with large bags.

In connection with the rates just above referred to I wish to mention that I am able, by structures embodying the features herein set forth, to secure such rates of operation for complete filling and packing cycles, including the placement of the bags in position, the filling and packing of the bags, and their removal from the machine; but I am able to secure operations in which the actual filling and packing of the bag, from the time of delivery of the batch into the bag until its complete filling and packing, with the auger and shaft risen to their top or "knock-off" position, is substantially two seconds, allowing the four additional seconds for all the other movements of the complete cycle.

A further feature of the invention relates to an improved form of drive for the auger and its shaft. In this connection it may be noted that due to the length of this shaft, and the fact that the working pressure is applied by the auger at its lower end, any tendency of the shaft to run out of true may be exaggerated. This feature of the invention, therefore, includes an arrangement whereby the shaft is effectively supported both at its upper end, and also adjacent to its lower or auger end.

A further feature of the invention relates to improvements whereby the operations of resetting the platform and connected parts are greatly simplified, and with consequent increase of rapidity of operations. In this connection, I have provided arrangements whereby at the completion of a filling and packing operation the parts are left in proper condition for introduction of a new or unfilled bag into place, and whereby thereafter by a simple movement of the arm or other portion of the body the operator can again bring all the co-ordinating parts into motion to automatically go through the filling and packing and delivering operations in proper relationship and timing.

In connection with the above feature, I have also provided a balanced arrangement whereby the resetting operations may be effected merely by release of a catch or trigger, and without the need of exertion on the part of the operator beyond the very light force needed to release such catch or trigger. This is of importance in connection with machines operating at high speeds, and wherein the operator is therefore called on to repeat the resetting movements many times per hour, with consequent fatigue and loss of efficiency.

A further feature relates to the provision of an arrangement whereby square bags or containers may be effectively and uniformly filled and packed, while still using the rotating auger arrangements. Also, in this connection a further object is to provide means to effectively support the square bags against rotation during the filling and packing operations.

Other objects and uses of the invention will appear from a detailed description of the same which consists in the features of invention and combinations of parts hereinafter described and claimed.

In the drawings:

Figure 7 shows a fragmentary central vertical section through the principal operating parts of the machine, being taken on the lines 7—7 of Figures 3, 4, 5 and 6, looking in the directions of the arrows;

Figure 8 shows a fragmentary face view of a portion of the delivery side of the machine, showing more in detail the arrangement of the bag holder and control therefor;

Figure 9 shows a horizontal section on the line 9—9 of Figure 8, looking in the direction of the arrows;

Figure 10 shows a horizontal section on the line 10—10 of Figure 8, looking in the direction of the arrows;

Figure 11 shows a fragmentary vertical section on the lines 11—11 of Figures 9 and 10, looking in the directions of the arrows;

Figure 12 shows a fragmentary face view of the gripping members for gripping the edge portions of the bag;

Fig. 13 shows a fragmentary vertical section through the auger hub and through the bearing for the lower end of the shaft, being taken on the line 13—13 of Figures 5 and 14, looking in the directions of the arrows, and on enlarged scale as compared with Figure 5;

Figure 14 shows a top plan view of the auger and hub of Figure 13, being taken on the line 14—14 of Figure 13 looking in the direction of the arrows;

Figure 15 shows a bottom face view of the auger and hub of Figure 13;

Figure 2:
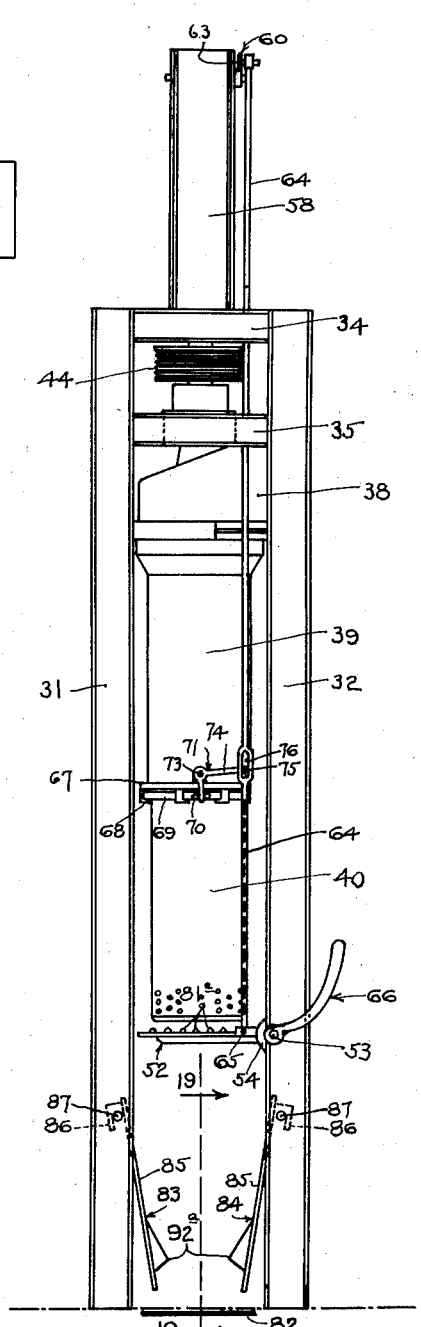
Figure 2 shows a side view of the machine of Figure 1, looking at the delivery side thereof.
Figure 3:
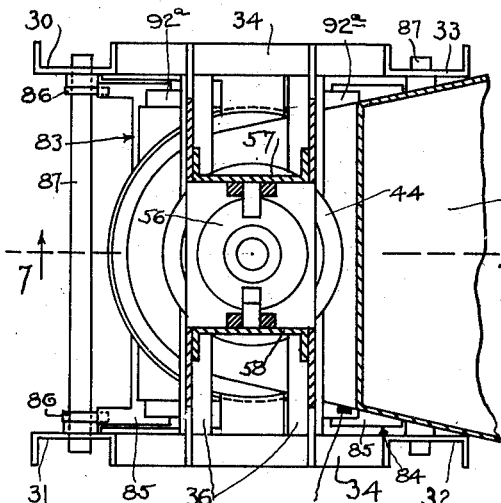
Figure 3 shows a horizontal section on the line 3—3 of Figure 7, looking in the direction of the arrows.
Figure 4:
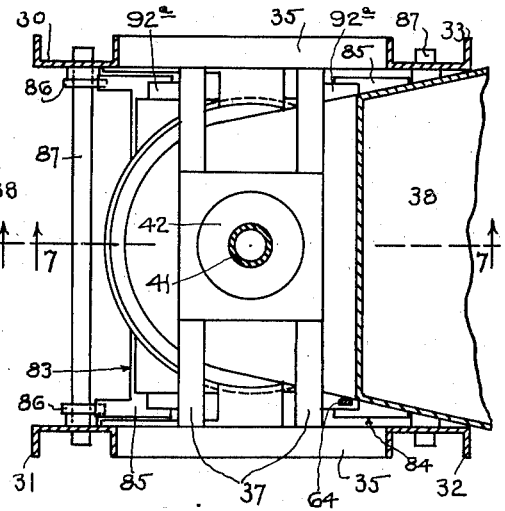
Figure 4 shows a horizontal section on the line 4—4 of Figure 7, looking in the direction of the arrows.
Figure 5:
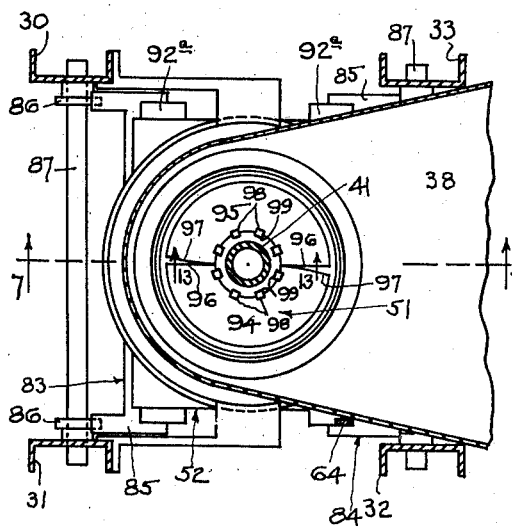
Figure 5 shows a horizontal section on the line 5—5 of Figure 7, looking in the direction of the arrows.
Figure 21:
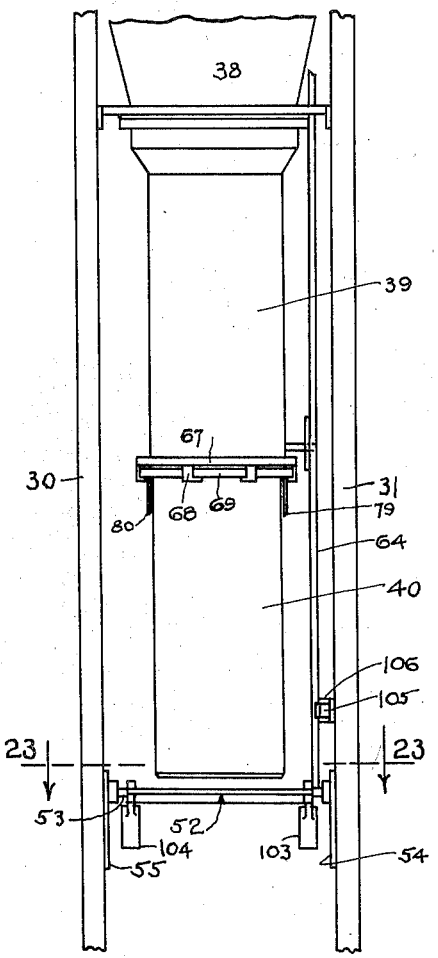
Figure 22:
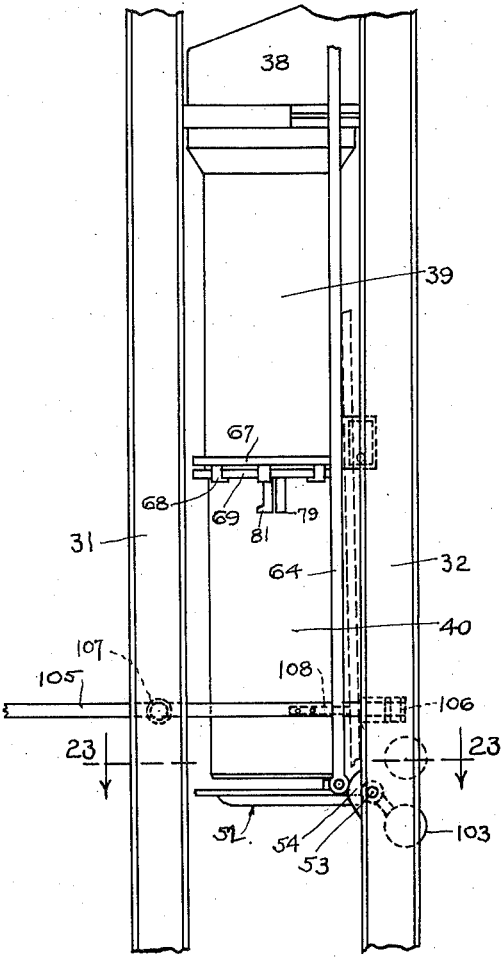
Figure 23:
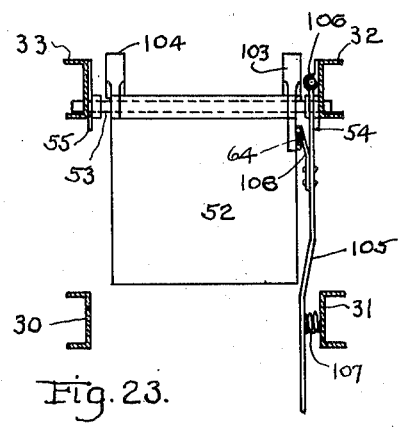
Figure 24:
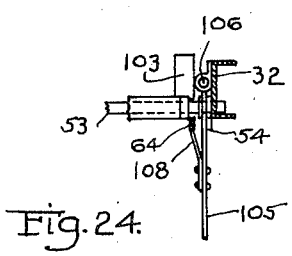

Figures 16, 17 and 18 show sections on the lines 16—16, 17—17 and 18—18 of Figure 14, looking in the directions of the arrows;

Figure 19 shows a face view of one of the baffle plates for dampening the fall of the filled bag, being taken on the line 19—19 of Figure 2, looking in the direction of the arrows, but on enlarged scale as compared with Figure 2;

Figure 20 shows a section on the line 20—20 of Figure 19 looking in the direction of the arrows;

Figure 21 shows a front elevation of a portion of another form of machine embodying the features of the present invention, and in which the platform is provided with a counterweight or counterweights so that it normally tends to return to its horizontal or working position, and which construction is also provided with a catch for retaining the platform in vertical position until such catch is purposely released by the operator;

Figure 22 shows a side elevation corresponding to Figure 21, the link being shown by dotted lines in the position which it occupies when the platform is in lowered position;

Figure 23 shows a horizontal section on the line 23—23 of Figures 21 and 22, looking in the directions of the arrows;

Figure 24 shows a fragmentary view of the rear right hand corner of the structure of Figure 23, but with the platform in released or vertical position, and with the catch in engagement with the link to hold the platform in such lowered position against the tendency of the counterweights;

Figure 25 shows a vertical section through the tubes and related parts of a further modified construction in which provision has been made for filling and packing square bags and the like, the platform being in horizontal position;

Figure 26 shows an elevational view corresponding to Figure 25; and

Figure 27 shows a horizontal section on the line 27—27 of Figures 25 and 26, looking in the directions of the arrows.

Referring first to the construction shown in Figures 1 to 20, the frame of the machine conveniently includes the four corner posts 30, 31, 32 and 33 of suitable structural shapes such as channels, as illustrated. These are conveniently braced and connected together, as by means of the cross pieces 34, 35, 36 and 37. The cross pieces 34 and 35 extend in pairs between the corner posts at the front and back of the machine; and the cross pieces 36 and 37 extend between the cross pieces 34 and 35 in pairs.

The supply chute for incoming flour or other material is shown at 38. It reaches in from the back of the machine to a circular central section; and the tubular upper section 39 reaches down from such central section, as well shown in several of the figures. There is a lower tubular section 40 telescopingly extended into the tubular section 39, so that such lower section 40 may rise and fall within the section 39 in harmony with the filling and packing operations.

The auger shaft 41 extends axially through the tubular telescoping sections just referred to; and in its upper portion this shaft finds suitable bearings in the two roller bearings 42 and 43 carried by the cross pieces 36, such bearings being sufficiently separated vertically to provide lateral rigidity for the shaft and to thereby ensure that it shall travel up and down and rotate truly. A drive pulley 44 or other drive means, is splined to the shaft, and thereby serves to drive the shaft as the latter moves up and down.

In the lower portion of the lower tubular section 40 there is provided a spider 45 having several radial arms whose outer ends are connected to the said lower tubular section, and the hub portion 46 of this spider carries a thrust roller bearing or the like, so that the shaft is not only connected to the tubular section, but so that as the shaft rises and falls the tubular section likewise rises and falls with the shaft. Preferably such bearing is set at the position of a shoulder 47 on the shaft, as shown in Figure 13.

Suitable means may be provided to prevent rotation of the lower tubular section, so that it will travel directly up and down; as for example, the slot 48 may be provided in the lower section, engaged by the vertical bar portion 49 of the upper tubular section; and if desired a thin plate may be placed over the slot 48 to prevent movement of material outwardly therethrough, although, as a matter of fact, any such material will be caught in the bag being filled and packed.

An auger 50 is secured to the lower portion of the shaft and beneath the spider; and sometimes a further auger 51 is also secured to the shaft above the spider, as shown in Figure 7. The forms and principles of these augers will be explained more fully hereinafter.

Beneath the lower end of the lower tubular section there is pivotally mounted the bag supporting platform 52. This platform is carried by a transverse hinge or pin 53 which lies parallel to the direction of conveyor travel, to be presently explained, so that when the platform is dropped down it will lie parallel to the travel of bags carried by the conveyor, and will not interfere with them. Such hinge or pin is conveniently carried by the brackets 54 and 55 on the posts 32 and 33 at the back side of the machine.

The upper end portion of the shaft 41 carries a block 56 through the medium of a suitable bearing, so that as the shaft rises and falls such block also rises and falls with the shaft, but does not rotate. There are provided a pair of upstanding brackets 57 and 58 on the upper portion of the machine, having suitable guides for the block 56, so that said block is likewise suitably guided in its up and down travels. Said block carries a pin 59 set into a hole in one end of the block 56; and there is a toggle bell-crank 60 pivoted to the upper portion of the bracket 58 at the point 61, so that in one position of such toggle bell-crank its arm 62 will rest on a part of the bracket 58 and be thereby prevented from further rotation in a counterclockwise direction when viewed as in Figure 1. The other arm 63 of this bellcrank is connected by a direct link 64 with a pin 65 at one side of the platform; so that, when the bell-crank rests in the position of Figure 1 the platform is supported rigidly in a horizontal position, whereas when the bell-crank is tilted over to the right in Figure 1, the link 64 is allowed to lower, and the platform may fall into a vertical position and discharge the filled and packed bag. It will be noted that the toggle nature of the bellcrank ensures that the weight of the platform and the load thereon will serve additionally to prevent the toggle from becoming reversed until such action is purposely effected.

When the shaft and the block 56 have travelled up to the top of their movement, the pin 59 will strike the bell-crank arm 62, reversing the bell-crank and permitting the platform to fall.

On the hinge or pin 53 there is provided an arm 66 in a convenient position for engagement by the arm of the operator, so that by merely pushing back such arm 66 he may again raise the platform, thereby also raising the link 64, and resetting the bell-crank, ready for another operation. This backward movement of the arm 66 should be effected after the operator has set a fresh bag upwards into place around the lower telescoping section 42, and ready for the commencement of a new filling and packing operation. It is thus noted that the operator may very conveniently set the fresh bag into place, and reset the platform and connected parts, all these operations being performed with great rapidity and ease.

There is a suitable bag supporting device for holding the upper portion of the bag in place during the filling operation. It is shown in detail in Figures 8, 9, 10, 11 and 12. This bag holder includes a split ring 67 clamped around the lower portion of the upper telescoping section 39. This split ring 67 is provided with a series of downwardly and inwardly extending hooks 68 which engage a rotatable ring 69 which may be rocked back and forth through an angle of a few degrees. Such rocking action is performed by means of the lower or vertical arm 70 of a bellcrank 71, which bell-crank is pivoted to an upstanding bracket 72 on the split ring 67, at the pivotal point 73. The horizontal arm 74 of this bell-crank has a pin 75 working in the slot 76 of the link 64 whereby the platform is controlled. The arm 70 of the bell-crank works between the two studs 77 and 78 on the rockable ring 69, so it will be seen that as the link 64 is moved up and down for platform control, the ring 69 is correspondingly rocked back and forth.

Downwardly extending from the split ring 67 are the diametrically opposite relatively stiff fingers 79 and 80, and downwardly extending from the rockable ring 69 are the corresponding relatively flexible fingers 81 and 82. These pairs of fingers are intended to co-operate with each other, so that when the ring 69 is turned into the position of Figures 8 and 10 the fingers are separated from each other, and will not exert any clamping action between them; whereas by rocking the ring 69 counterclockwise when viewed as in Figure 10 it will be seen that the paper bag between the pairs of fingers will be clamped at diametrically opposite points with a spring clamping action. Such clamping will be sufficient to effectively prevent the bag from dropping down prior to support by the platform; and when the platform is dropped after the filling and packing operation has been completed these fingers will grip the upper edge portion of the filled bag with sufficient tension to ensure that the bag will descend with the platform in an orderly manner, the gripping action not being sufficient to interfere with proper bag delivery.

Now it will be noted that the slotted connection between the pin 75 and the link 64 will cause a delayed action to occur in the rocking of the bell-crank 71. This delay in such rocking is such that during the operation of turning the platform into the horizontal position the completion of the upturning of the platform will be accompanied by a complete clamping action; whereas, when the link 64 is released by overthrow of the toggle bell-crank 60, the platform may descend to a considerable angle with consequent commencement of delivery of the filled and packed bag prior to engagement of the upper end of the lot 76 with the pin 75, and during this interval the fingers are still in clamping co-operation, so that the bag edge is still gripped, and thus as the descent of the bag commences it is held under tension and thereby delivered in good and pleasing condition.

It will be noted that I have provided a series of ribs or the like 81a on the top surface of the platform, and extending across the same. These will assist in preventing any tendency of the bag to rotate during the filling and packing operation, presently to be explained.

Figure 1:
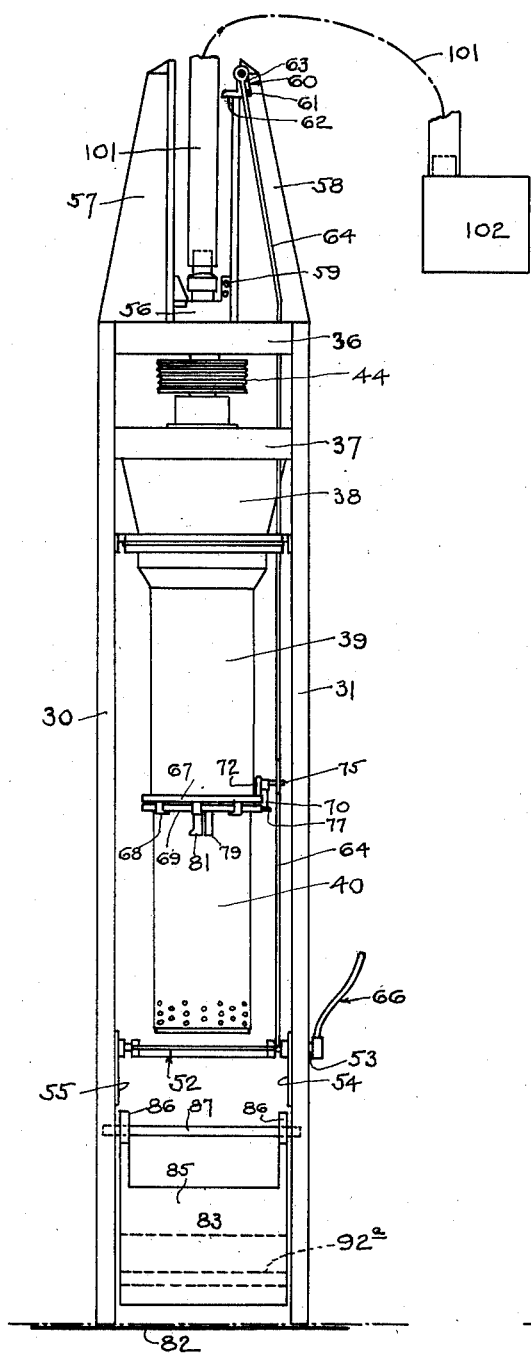
Figure 1 shows a front elevational view of a typical packer embodying features of my present invention.
Figure 6:
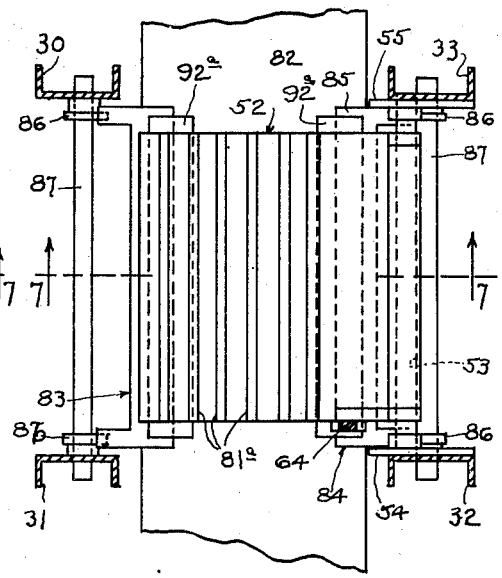
Figure 6 shows a horizontal section on the line 6—6 of Figure 7, looking in the direction of the arrows.

The delivered bags are received on the top surface of a transversely travelling belt conveyor 82 (see Figures 1, 2 and 6). This conveyor travels across the packer from left to right when viewed as in Figure 1, or towards the observer when viewed as in Figure 2. It will be noted that the platform 52 is high enough above the conveyor to permit the filled bags from another machine to pass beneath such platform. Located between the front and rear pairs of frame members 30—31 and 32—33, respectively, there are the baffles or dampeners 83 and 84, respectively. Each of these comprises a plate 85, having near its upper edge a pair of hook-shaped lugs 86 which may be hooked over a transversely extending rod 87 carried by the frame members, as shown. With this arrangement it is possible to set each of the baffles into place without difficulty, and without the need of using special tools, etc. For each of these baffles there is provided a suitable spring 88 which urges the baffle outwardly until limited by a stop. There is also provided for each baffle a suitable shock absorber, such as a hydraulic shock absorber 89, mounted on one of the frame members, and connected to the baffle by means of a link connection 90 with a pin and slot as shown at 91. The stop pin 92 is provided to limit the outward movement of the baffle under the impulse of its spring 88. Such limiting action takes place at a point such that a proper baffling action will be produced to limit the shock of descent of the downwardly moving filled bag, but nevertheless there is still left a substantial opening between the pair of baffles so that an oncoming filled and packed bag from another machine may pass between the baffles without serious obstruction from them.

In connection with the foregoing feature it is to be noted that the ability to pass filled and packed bags from another machine between the baffles is ensured by placement of the baffles parallel to the direction of conveyor travel, instead of transverse thereto, as in my earlier application hereinbefore referred to.

On the lower portion of the baffling face of each baffle there is placed or formed a shoe or ridge 92a. These shoes or ridges extend across the respective baffles, and therefore lie transversely of the descending movement of the filled bags; and the upper face of each of these shoes is of a relatively easy slope, whereas the lower face thereof may be of a steeper slope, as well shown in Figure 20. Thus, during the descent of the bag it will be gripped between the easy top sloping faces of the shoes of the opposing baffles with a constantly increasing gripping action as the descent progresses; and the rapid slope of the bottom faces of these shoes will ensure ready disengagement of the bag from the said gripping action.

It will be noted from Figure 19 that each of the shoes or ridges 92a has an easy approach at the left hand end thereof, that is, at the side of the machine from which a filled and packed bag will approach when carried by the conveyor from another machine. By this means I make it easy for the bags of another machine to pass between the baffles of the machine here being considered, as such other bags may readily wedge themselves between shoes or ridges of such formation.

I shall now discuss more in detail the form of the auger, and the means to ensure satisfactory aeration, as herein set forth; it being distinctly understood that I do not intend to limit myself thereto, except as I may do so in the claims to follow.

Referring first to Figures 13 to 18, inclusive, the auger includes a hub portion 93 which is secured to the shaft (whether solid or tubular) in any suitable manner. Secured to this hub are the two identical blades 94 and 95, each preferably made of sheet metal of satisfactory gauge to ensure the desired stiffness. Each of these blades is of generally semicircular form, and is bent so that its radial leading edge 96 extends outwardly radially in a plane normal to the axis of rotation of the shaft. Then the blade is so formed that its outer edge curves downwardly as the outer periphery is traced around the blade, and so that its inner edge connected to the hub also curves downwardly as said inner edge is traced around the hub; and the downward deflection of the outer edge takes place at all points faster than the downward deflection of the inner edge, and with an increasing rate of such downward deflection, and with the deflection in the general form of a scoop, as well shown by examination and comparison of Figures 14, 16, 17 and 18. Thus, in Figure 14 the leading edge is shown as straight out at the right hand of said figure, whereas the trailing edge 97 is shown as curved down and scooped inwardly as shown at the left hand of said figure; and Figures 16, 17 and 18 show successive sections through the blade according to the section lines on Figure 14.

The form of blade above disclosed will serve to create a scooping tendency as rotation thereof continues, keeping in mind the fact that the auger is pressing down on the material undergoing treatment, and this scooping tendency will tend to shift the material towards the axis of rotation, thus overcoming the centrifugal tendency to throw the material outwardly due to the rapid rotation of the auger. Furthermore, such scooping tendency will also tend to carry entrained air towards the axis of rotation; but above all there will be created a better and more even distribution of the material being packed, with an attendant more uniform packing action over the entire cross-sectional area of the slug.

I may mention that when using augers of substantially ten to twelve inches diameter, and having blades of a pitch of substantially eight to ten inches (that is, advancement along the axis of eight to ten inches per revolution of the auger), and speeds of upwards of seventeen hundred revolutions per minute, I secure axial travel rates of upwards of 1130 to 1410 ft./min., that is, there would be axial travel of 1130 to 1410 ft./min. in case of no slip. Such high rates of pitch movement are desirable to make possible the very rapid filling and packing desired, and to ensure the transfer of the batch of material from its point of entrance above the auger, through the auger, to the packed location beneath the auger, with simultaneous rise of the auger and shaft through such material to the final "knock-off" position. Such rates and proportions are herein mentioned by way of illustration of the possible operations of machines embodying features of the present invention, and not by way of any limitation, except as I may limit myself in the claims.

Now the entrained air will require release, as I have already explained. For this purpose I have provided the hub 93 of the auger with a series of more or less spirally extending grooves 98 extending from a position beneath the blades to a position above the blades, so that entrained air beneath the auger may find its way upwards past the blades to a position above the blades, for discharge. In order to amplify the sizes of the air openings thus created I prefer to provide similar and companion slots 99 in the inner edges of the blades, as well shown in Figures 14 and 15.

Now the air thus delivered to the top face of the auger may find its way out through the mass of material flowing down to the auger, and which material is as yet not being compressed; but I prefer to make special provision to facilitate the complete release of such air. For this purpose I sometimes make the shaft hollow as well shown in Figures 3, 4, 5, 7, 9, 10, 11, 13, 14 and 15. Since the shaft extends to a position above the supply chute this air conduit may effectively deliver the released air to the outside of the machine. It is noted that in Figure 13 I have shown both an upper and a lower auger, and have shown the upper auger as being placed on a tubular portion of the shaft, whereas the lower auger is shown therein as being placed on a solid portion of shaft. Sometimes the tubular shaft condition may be carried down low enough to bring both augers (when used) into registry with the tubular portion; or conversely, sometimes both augers (when used) may be placed on solid portions of the shaft. Furthermore, it will be understood that I do not intend to limit myself to provision of augers of the relative axial dimension shown in the various figures, as said auger or augers may be of greater or less axial dimension as decided upon. Holes 99a may be formed in the hollow shaft adjacent to the top face of the auger to permit the air to reach the bore of the shaft.

Now there will also be air released from the body of material undergoing treatment at the outer peripheral portion of the auger. Such outer released air may be effectively delivered outwardly towards the outer periphery of the slug or mass undergoing compression; and to release such air effectively, I have provided the lower portion of the tubular section 40 with a series of holes 100 as well shown in Figures 1, 2, 7 and 21. These holes are preferably placed within a zone or zones approximately on the same level with the lower half of the lower auger, and these holes are preferably numerous and of relatively small size so that the tendency of the material to work out through these holes will be reduced to a minimum. The air so released through these holes will find its way to a location close to the surface of the bag, and thence upwards along such surface to the top of the bag whence it may deliver out through the chute 38 against the inflowing material.

It will now be seen that I have provided means to effect the release of air both from the central portion of the mass undergoing compression, and also from the peripheral portion of such mass; thereby ensuring a very complete and rapid release of such air. This is a feature of very great importance in securing very rapid operations and compression of such materials as flour, feeds, and the like, since it has been found that unless the air is effectively released during the compressing operation, the material will again expand when the compressing force is released, and the bags will not be uniformly and properly filled when delivered from the packer. This difficulty is effectively overcome by either or both of the arrangements herein disclosed for elimination of air.

When it is desired to still further accentuate the aeration of the central portion of the mass, the hollow shaft may be connected by a suitable flexible connection such as the hose 101 with an exhauster or low pressure chamber 102. The degree of vacuum to be maintained in such connection will depend on the operation being conducted, and the rapidity with which the cycles of operation are being carried through, but generally a moderate reduction of pressure will suffice to accomplish the desired result.

It is here noted that with the arrangements so far described the tendency is for the platform 52 to swing down into a vertical position and remain in such position due to the manner in which it is pivoted; and therefore the restoring operation to replace it in horizontal position and reset the toggle bell-crank 60, must be effected by sufficient force exerted against the arm 66 or equivalent operation. This restoring force may be of some magnitude, due to weight of parts, and when carrying through operations at high speed and great frequency, the work may become very exhausting to the operator.

In the arrangement of Figures 21, 22, 23 and 24 I have provided the counterweights 103 and 104 connected to the platform or its pivot shaft, said counterweights being of sufficient size and mass, and properly related to the platform so that they may restore the platform and the link 64 to normal working position when the filled bag has been discharged from the lowered platform. In other words, the counterweights are not of sufficient force to prevent proper discharge of a filled bag, but are sufficient to restore the emptied platform to its normal horizontal position, and carry the link and connected parts back to normal position.

Now with the arrangement so far described, the platform would immediately restore to horizontal position before the operator could place another bag in position around the tube 40. In order to retain the platform and connected parts in their lowered position I have provided a catch which may be easily disengaged by the operator without the exertion of more than slight force. I avail myself of the fact that the link 64 rocks backwardly during the down swing of the platform, as shown by the dotted lines in Figure 22 to effect this catch. I provide an arm 105, hinged to the right rear post 32 by the hinge 106, which permits said arm to swing sidewise, but prevents the arm from falling downwardly. The front end of this arm is located convenient to the right arm of the operator, so that he may, by a simple sidewise movement of his arm press the arm 105 to the right. This arm 105 is normally spring pressed to the left by a spring 107 on the front right hand post. There is a light leaf spring catch 108 provided on the inside or left face of the arm 105, and in position such that as the link 64 moves backwardly during the down swing of the platform said catch 108 will spring out in front of the link, and will thus prevent return forward movement of the link until the arm 105 has been pressed to the right by the operator against the spring 107. With this arrangement the platform is held down until the operator is ready for commencement of another cycle of movements.

It is frequently desirable to be able to fill and pack square or rectangular bags or containers, while still making use of the rotating auger feature and other features herein referred to. It has heretofore been found that the packing of these rectangular containers with a rotating auger arrangement or otherwise, has entailed the use of tamping means to ensure proper and uniform packing of the material into such a container, and to ensure fillage of the corner portions thereof. Frequently such tamping has been accomplished during a special operation after the filling operation, proper, thus entailing additional expense of the filling and packing operations, and provision of additional equipment for the tamping operation itself.

In Figures 25, 26 and 27 I have shown a still further modification of my invention, wherein I have made provision for satisfactory filling and packing of square or rectangular containers, and without the need of using special tamping or other means, as an operation distinct from the filling operation itself. In this case I have provided the rectangular guards or shields or masks 109 and 110 in conjunction with the lower tubular section 111, said guards or shields or masks being of comparatively light sheet metal, and secured to the tubular section in a slightly loose condition, as for example, by the pivotal connections 112 near their upper and inner corners. The lower ends of these guards or masks are preferably battened inwards as shown at 113, and they rest against the lower end portion of the tubular section 111 as shown in Figure 25. With this arrangement the bag can be readily slipped up and over the rectangular guards or masks, and in so doing the bag will be forced out into the desired rectangular form; and by proper proportioning of parts and use of somewhat springy guards or masks the bag will be held in place without the need of using special bag clamping means such as disclosed hereinelsewhere.

In order to prevent rotation of the bag during the filling and packing operations I prefer to provide the platform 52 with a rectangular depression 114 of form proper to receive the bag, so that the lower portion of the bag will sit nicely therein during the filling and packing operations. Preferably, also, there will be provided a single cross-wise extending ridge 115 in said depression, and over which the bottom of the bag will settle to thereby create still further holding action.

With this arrangement the lower tubular section 40 should be placed to the outside of the upper tubular section, so that the shields or masks may travel up with the lower section during the filling and packing operations. For this reason I have shown such arrangement in Figures 25, 26 and 27. For like manner, I have also, in said figures shown the parts of proper proportioning to permit the necessary full upward travel of the lower section and the spider and lowering shaft bearing, without interference with the lower end of the upper tubular section.

While I have herein shown and described only certain embodiments of the features of my present invention, still I do not intend to limit myself thereto, except as I may do so in the claims to follow.

I claim:

1. In a machine of the class described, the combination of a vertical stationary tube, means to supply material to be packed to the same, a second tube telescopically mounted within said first mentioned tube, and capable of vertical movement thereinto, an auger shaft within said telescopically mounted tube and vertically movable axially, an auger on the lower portion of said shaft, bearing means to connect the lower portion of the shaft with the second mentioned tube, effectively to cause said tube to rise and fall with the shaft, means to clamp a bag to the stationary tube and around the tubes during the filling and packing operation, and means to make ineffective such clamping means at a predetermined elevation of the shaft, substantially as described.

2. In a machine of the class described, the combination of a vertical stationary tube, means to supply material to be packed to the same, a second tube telescopically mounted within said first mentioned tube and in sliding and sealing contact therewith, and capable of vertical movement to a position below the first mentioned tube, an auger shaft vertically movable with respect to said first mentioned tube, an auger on the lower portion of said shaft, means to connect said shaft to the second mentioned tube, effectively to cause said tube to rise and fall with said shaft, and means to clamp a bag stationary to the stationary tube and around said tubes during the rising movement of the shaft, auger and second mentioned tube, substantially as described.

3. In a machine of the class described, the combination of a pair of tubes comprising an upper and a lower tube, telescopically mounted with respect to each other, means to support the upper tube stationary, means to supply material to be packed into said tube, the lower tube being capable of vertical movements with respect to the upper tube and telescoping into the upper tube and in sliding and sealing contact therewith, a shaft extending axially through the tubes and capable of vertical axial movements while being rotated, an auger on the lower portion of said shaft, means to connect the lower tube to the shaft, effectively to ensure vertical movements of said tube harmoniously with the vertical movements of the shaft, and means to clamp the upper portion of a bag stationary to the stationary tube and around the tubes during the filling and packing operation, substantially as described.

4. In a machine of the class described, the combination of a suitable bag support, means to supply material to be packed thereinto, a shaft extending vertically through said parts, and an auger on said shaft, said auger including a hub on the shaft, together with a substantially circular segmental blade extending outwardly from said hub, said blade having its leading edge lying substantially in a radial line normal to the axis of rotation, and the surface of the blade being warped downwardly with respect to the shaft, to thereby bring successive points of the periphery of the blade to successively lower positions, with each such point at a position lower than the corresponding inner end of a radial plane drawn through such point, substantially as described.

5. In a machine of the class described, the combination of a suitable bag support, a shaft extending vertically therethrough, an auger on the shaft, means to supply material to be compressed to the position of the auger, and means to drive the shaft, said auger including a hub portion on the shaft, together with a segmental blade extending outwardly from said hub portion, said blade having its leading edge extending substantially radially outward from the hub in a plane substantially normal to the axis of rotation, and the surface of the blade being warped in a direction against the material to be compressed in a manner to bring the outer edge of the blade to successively lower positions, measured backwardly along said edge, and with successive radial sections of the blade formed with curves concave downwards against the material undergoing compression, and of increasing concavity measured backwardly around the blade, whereby said material is caused to draw towards the axis of rotation and against centrifugal tendency due to the rapidity of rotation of the blade, substantially as described.

6. In a machine of the class described, the combination of a vertical tube having means for reception of material to be compressed at its upper end, a vertical shaft extending axially through said tube, an auger on said shaft within the tube, a supporting platform hinged on a horizontal axis near the lower end of the tube and capable of down swing to deliver a filled package away from the tube latch means to retain the platform against down swing during a filling operation, means to disengage said latch means at completion of a filling operation, a counterbalance tending to retain the platform in horizontal position but yieldable under the load of a filled container, for delivery of said container, other latch means to retain the platform in down swung position against the tendency of the counterweight, and away from the lower end of the tube, and means convenient to the operator for disengaging said last mentioned latch means to permit restoring movement of the platform to horizontal position under the tendency of the counterweight, substantially as described.

7. In a machine of the class described, the combination of a vertical tube for material to be compressed, a shaft extending vertically therethrough, an auger on said shaft, platform means having an up and down movement beneath the tube to support a bag to be filled with material under the influence of the auger, latch means to support the platform permitting down movement of the platform for delivery of a filled bag under the weight thereof, means tending to restore the platform to bag supporting position for another operation, other latch means to retain the platform in bag delivered position against the tendency of the restoring means aforesaid, and means convenient to the operator serving the machine for releasing the last mentioned latch means aforesaid to permit restoration of the platform to the bag supporting position, substantially as described.

8. In a machine of the class described, the combination with means to support a bag stationary in upended position, of a vertically extending vertically movable shaft axially within said bag supporting means, means to drive the shaft at any intended position of vertical movement of the shaft, means to supply material to be packed into the bag, and an auger carried by the shaft and vertically movable therewith, said auger including a blade having a pitch against the direction of blade rotation, the contour of the working face of said blade also including a pitch towards the axis of rotation measured on sectional planes parallel to the axis of rotation which sectional planes are successively more backward against the direction of rotation, whereby material undergoing compression by said auger is also forced towards the axis of rotation to thereby resist centrifugal tendency set up in said material by reason of the rate of auger rotation, substantially as described.

9. In a machine of the class described, the combination with means to support a bag in upended position, of a vertically extending shaft extending into the so-supported bag, means to supply material to be packed into said bag, and an auger carried by the shaft and including a blade having a pitch against the direction of blade rotation, the contour of the working face of said blade also including a pitch towards the axis of rotation measured on sectional planes parallel to the axis of rotation which sectional planes are successively more backward against the direction of rotation, whereby material undergoing compression by said auger is also forced towards the axis of rotation to thereby resist centrifugal tendency set up in said material by reason of the rate of auger rotation, substantially as described.

10. In a machine of the class described, the combination with a vertically movable vertically extending shaft, an auger on said shaft, and a vertically movable tube around the shaft and auger, and means to ensure conjoint vertical movements of all said parts, of means to support a bag being filled and packed stationary beneath said parts, said supporting means being capable of up and down movements with respect to said parts, means to lock said supporting means stationary in up working position with respect to said parts for support of a bag being filled and packed during the filling and packing operation, means to disengage said locking means upon completion of a filling and packing operation, to permit downward bag discharging movement of said supporting means, means tending to restore said supporting means up to bag supporting position for a new operation, and manually releasable means to lock said bag supporting means against the tendency of said restoring means, effectively to permit manual control of the initiation of a filling and packing operation, substantially as described.

11. In a machine of the class described, the combination with a vertically movable non-horizontal shaft, and an auger on said shaft, of means to support a bag being filled and packed stationary beneath said parts, said supporting means being capable of up and down movements with respect to said parts, means to lock said supporting means stationary in up working position with respect to said parts for support of a bag being filled and packed during the filling and packing operation, means to disengage said locking means upon completion of a filling and packing operation, to permit downward bag discharging movement of said supporting means, means tending to restore said supporting means to bag supporting position for a new operation, and manually releasable means to lock said bag supporting means against the tendency of said restoring means, effectively to permit manual control of the initiation of a filling and packing operation, substantially as described.

12. In a machine of the class described, the combination with a shaft and auger mounted for rotation about a non-horizontal axis, of means to support a bag being filled and packed stationary with respect to said parts during a filling and packing operation, said means being capable of up and down movements with respect to said parts, means to lock said supporting means stationary in up working position with respect to said parts for support of a bag being filled and packed, means to disengage said locking means for downward delivery of a filled and packed bag, from said supporting means, means tending to restore said supporting means to bag supporting position for a new operation, and manually releasable means to lock said supporting means against the tendency of said restoring means, effectively to permit manual control of the initiation of a filling and packing operation, substantially as described.

13. In a machine of the class described, the combination of a vertical packing and filling tube, a shaft extending axially through said tube, an auger on said shaft, means to support said shaft to permit axial movements thereof during the packing and filling operation, a platform beneath the lower end of the tube and having an up and down movement, latch means to support said platform in up position during a filling and packing operation, means to make inoperative said latch means at the completion of an upward movement of the shaft and auger, to thereby permit downward movement of the platform and the filled and packed bag for discharge purposes, means to latch the platform in its downwardly moved position, manual means to disengage said last named latch means, bag clamping means in connection with said tube, including a movable member having a bag clamping portion, together with means to connect said movable member of the bag clamping means with the platform supporting latch means, whereby said bag clamping means is moved to bag clamping and bag releasing positions harmoniously with movements of the said latch means, said last named connecting means including a lost motion connection, substantially as and for the purpose set forth.

14. In a machine of the class described, the combination of a vertical packing and filling tube, a shaft extending axially through said tube, an auger on said shaft, means to support said shaft to permit axial movements thereof, during the packing and filling operation, a platform beneath the lower end of the tube and having an up and down movement, latch means to support said platform in up position during a filling and packing operation, means to make inoperative said latch means at the completion of an upward movement of the shaft and auger, to thereby permit downward movement of the platform and the filled and packed bag for discharge purposes, bag clamping means in connection with said tube, including a movable member having a bag clamping portion, together with means to connect said movable member of the bag clamping means with the platform supporting latch means, whereby said bag clamping means is moved to bag clamping and bag releasing positions harmoniously with movements of said latch means, substantially as and for the purpose set forth.

ALFRED SOWDEN.